(12) United States Patent
Hasinovic et al.

(10) Patent No.: US 7,381,250 B2
(45) Date of Patent: Jun. 3, 2008

(54) INTERIOR PROTECTANT/CLEANER COMPOSITION

(75) Inventors: Hida Hasinovic, Lexington, KY (US); Tara Weinmann, Lexington, KY (US)

(73) Assignee: Ashland Licensing and Intellectual Property, LLC (ALIP), Lexington, KY (US)

( * ) Notice: Subject to any disclaimer, the term of this patent is extended or adjusted under 35 U.S.C. 154(b) by 0 days.

(21) Appl. No.: 11/640,440

(22) Filed: Dec. 15, 2006

(65) Prior Publication Data

US 2007/0163463 A1 Jul. 19, 2007

Related U.S. Application Data

(60) Provisional application No. 60/750,609, filed on Dec. 15, 2005.

(51) Int. Cl.
```
C09G 1/08      (2006.01)
C09G 1/02      (2006.01)
C09G 1/12      (2006.01)
C09K 3/00      (2006.01)
C09K 3/18      (2006.01)
C09D 183/00    (2006.01)
C09D 191/00    (2006.01)
```

(52) U.S. Cl. .............. 106/10; 106/2; 106/3; 106/18.29; 106/271; 106/272; 252/8.57; 252/380; 510/244; 510/275; 516/77

(58) Field of Classification Search .................... 106/2, 106/3, 10, 18.29, 271, 272; 252/8.57, 380; 510/244, 275; 516/77
See application file for complete search history.

(56) References Cited

U.S. PATENT DOCUMENTS

| | | | |
|---|---|---|---|
| 5,217,758 A * | 6/1993 | Greenleaf et al. | 427/387 |
| 5,326,387 A * | 7/1994 | Faber et al. | 106/3 |
| 5,462,587 A * | 10/1995 | Greenleaf et al. | 106/2 |
| 5,520,843 A * | 5/1996 | Wright | 510/244 |
| 5,782,962 A * | 7/1998 | Burke et al. | 106/2 |
| 5,925,341 A * | 7/1999 | Cervantes et al. | 424/78.03 |
| 6,013,323 A * | 1/2000 | Klayder et al. | 427/384 |
| 6,206,956 B1 * | 3/2001 | Muntz et al. | 106/3 |
| 6,221,433 B1 * | 4/2001 | Muntz et al. | 427/387 |
| 6,227,200 B1 * | 5/2001 | Crump et al. | 128/207.16 |
| 6,342,556 B1 * | 1/2002 | Batdorf et al. | 524/432 |
| 6,461,537 B1 * | 10/2002 | Turcotte et al. | 252/194 |
| 6,494,767 B2 * | 12/2002 | Fisher | 451/28 |
| 6,607,717 B1 * | 8/2003 | Johnson et al. | 424/70.12 |
| 6,685,765 B1 * | 2/2004 | Ghodoussi | 106/10 |
| 6,933,268 B2 * | 8/2005 | White | 510/405 |
| 2002/0160224 A1 | 10/2002 | Barger et al. | |
| 2003/0220221 A1 | 11/2003 | McDonald et al. | |
| 2004/0180213 A1 | 9/2004 | Harris et al. | |

FOREIGN PATENT DOCUMENTS

| | | |
|---|---|---|
| WO | WO 02/074448 A2 | 9/2002 |
| WO | WO 2004/106422 A1 | 12/2004 |
| WO | WO 2005/081602 A1 | 7/2005 |

OTHER PUBLICATIONS

Technical Brochure entitled "Innovation Within Umicore Zinc Oxide", from Umicore NanoMaterials, Olen Belgium, published Dec. 2005 showing microphotographs of zinc oxide nano particles.

* cited by examiner

*Primary Examiner*—Anthony J Green
(74) *Attorney, Agent, or Firm*—Carrithers Law Office PLLC; David W. Carrithers

(57) ABSTRACT

The present invention provides a liquid protectant composition composed of a cationic microemulsion of a natural wax (carnauba wax) nanometer sized particles and zinc oxide nanometer sized particles in combination with a quaternary siloxane compound. The protectant composition of the present invention cleans, protects preserves and enhances the appearances of leather or vinyl surfaces used for covering items in the home or in vehicles. The product is easy to apply to both smooth and textured surfaces and has a transparent appearance. The product dries quickly and does not leave an oily residue. Utilization of nano technology to select components having nano sized particles provides a uniform deposition of the product leaving a thin film having exceptional protection properties. Unlike conventional protectants, the invention of the instant composition dries quickly and leaves no oily residue behind.

30 Claims, 8 Drawing Sheets

INTERIOR PROTECTANT/CLEANER COMPOSITION

This application claims priority from U.S. Provisional Application Ser. No. 60/750,609 filed on Dec. 15, 2005 which is incorporated by reference herein.

BACKGROUND OF THE INVENTION

1. Technical Field

The present invention provides a liquid protectant composition composed of nanometer sized carnauba wax particles and zinc oxide nanometer sized particles in combination with a silicone quat for cleaning, protecting and enhancing the appearance of leather and vinyl on interior surfaces.

2. Description of the Prior Art

Automotive and household products such as upholstery for automobiles, boats, planes, trucks, and other vehicles, in addition to house hold items such as furniture are comprised in large part of vinyl or leather materials. Exposure of these materials to heat and light, especially in extreme environmental conditions such as the interior of an automobile can degrade and damage the material over time resulting in discoloration, cracking and fading of the material.

Protectant products have been developed to coat the surface of these materials to minimize the degradation of the material due to environmental factors and provide a durable and shiny appearance. Problems occur when the products are sprayed onto a surface to be protected such as the vinyl surface of a car door or dash and over spray results in a residue on the interior of the glass. Alternatively, the product may be composed of a gel typically does not spray as easily in cold weather and may leave too thick of a coating on the surface resulting in a slippery or greasy surface.

Compositions for protecting rubber, plastic, vinyl, and the like are known in the prior art. For instance, U.S. Pat. No. 5,782,962 by Burke et al. teaches a coating composition containing a fluorine containing polymer, micronized wax, hydrocarbon solvent, organosilicone compound, surfactant and water. U.S. Pat. No. 6,013,323 by Klayder et al. teaches a silicone gel wax for metal surfaces. U.S. Pat. No. 6,685,765 by Ghodoussi teaches a composition containing a wax, ultraviolet protectant, and surfactant containing an anionic and cationic surfactant. U.S. Pat. No. 6,342,556 by Batdorf et al. utilizes submicronized zinc oxide together with an acrylic latex composition and viscosity control agent to maximize UV protection. U.S. Pat. No. 6,494,767 by Fisher teaches a composition containing micronized wax, organic solvent, emulsifier, silicone liquid in water. U.S. Pat. Nos. 5,217,758 and 5,462,587 by Greenleaf et al. teaches the use of a polysiloxane, diluent, and micronized wax composition. U.S. Pat. No. 6,221,433 teaches a organopolysiloxane based composition for elastomeric applications. U.S. Pat. No. 6,227,200 by LeGrow teaches a alkylaryl polysiloxane copolymer composition for protecting vinyl and rubber surfaces. U.S. Pat. No. 6,933,268 by White teaches the use of a composition containing a cleaning agent, silicone, thickener, neutralizing agent, ultraviolet agent, and water. U.S. Pat. No. 5,520,843 by Wright teaches the use of a water based emulsion of acrylic copolymer containing polyethoxylated alkylphenol and ammonium hydroxide. U.S. Pat. No. 6,206,956 by Muntz et al. teaches a organopolysiloxane emulsion based composition for protecting elastomeric surfaces. U.S. Pat. No. 5,326,387 by Faber et al. teaches the use of a volatile silicone fluid, an amino-functional silicone fluid, and an organopolysiloxane fluid to protect rubber, vinyl, and leather surfaces.

BRIEF DESCRIPTION OF THE DRAWINGS

A better understanding of the present invention will be had upon reference to the following description in conjunction with the accompanying drawings in which like numerals refer to like parts throughout the several views and wherein.

SUMMARY OF THE INVENTION

Figure 1:
FIG. 1 shows a sample comparison from dust adherence test (panel set A), with the composition of the instant invention of Example 1 on the left, control in the center, and Brand X competitor product on the right.
Figure 2:
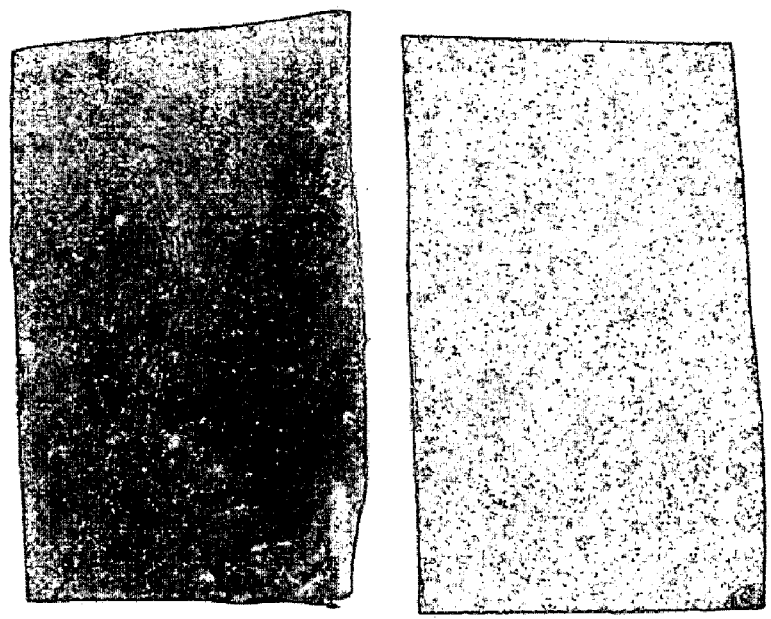
FIG. 2 shows a sample comparison from dust adherence test (panel set B), with the composition of the instant invention of Example 1 on the left, control in the center, and Brand X competitor product on the right.
Figure 3:
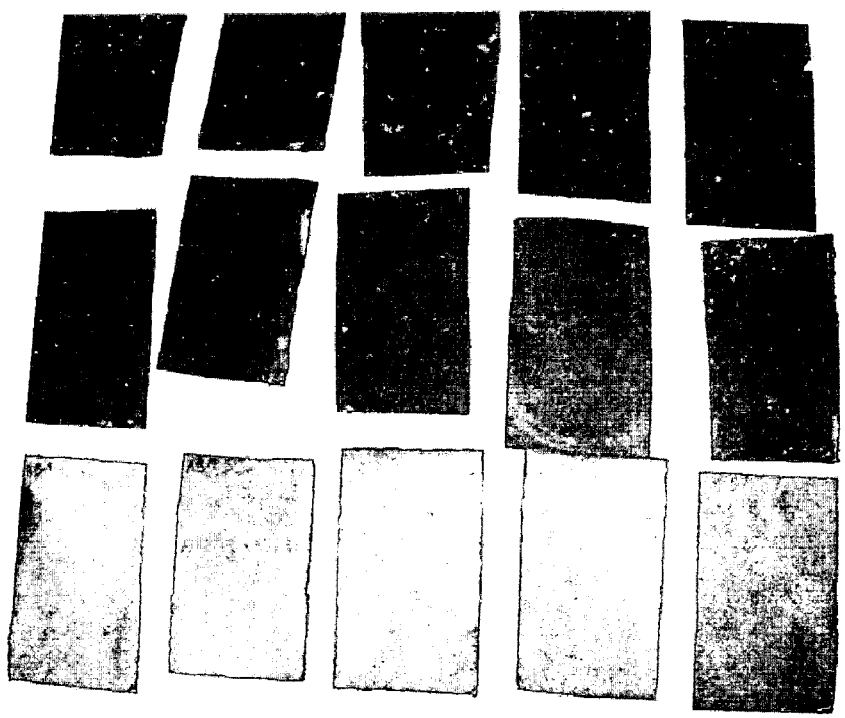
FIG. 3 shows a sample comparison from dust adherence test (panel set B), with the control on top, composition of the instant invention of Example 1 in the center, and Brand X competitor product on the bottom.
Figure 4:
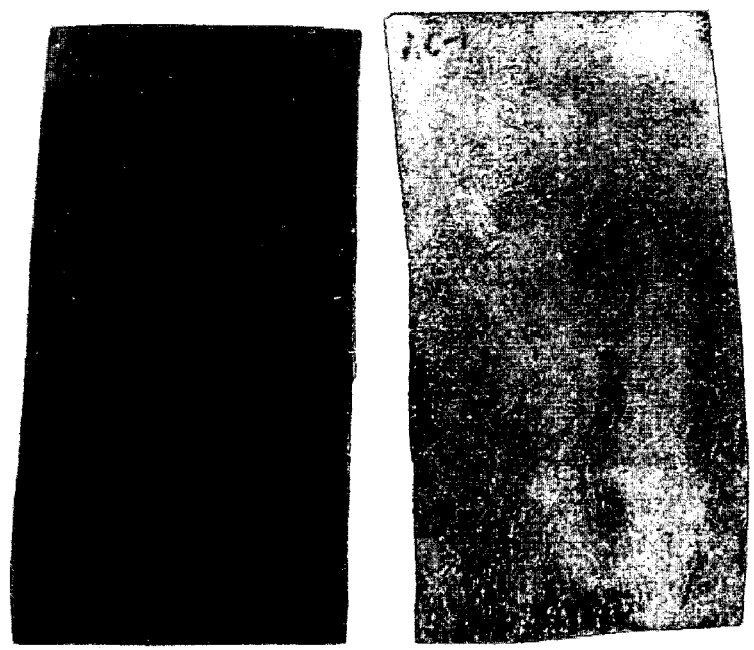
FIG. 4 shows a sample comparison from dust adherence test (panel set C), with the composition of the instant invention of Example 1 on the left and Brand X competitor product on the right.
Figure 5:
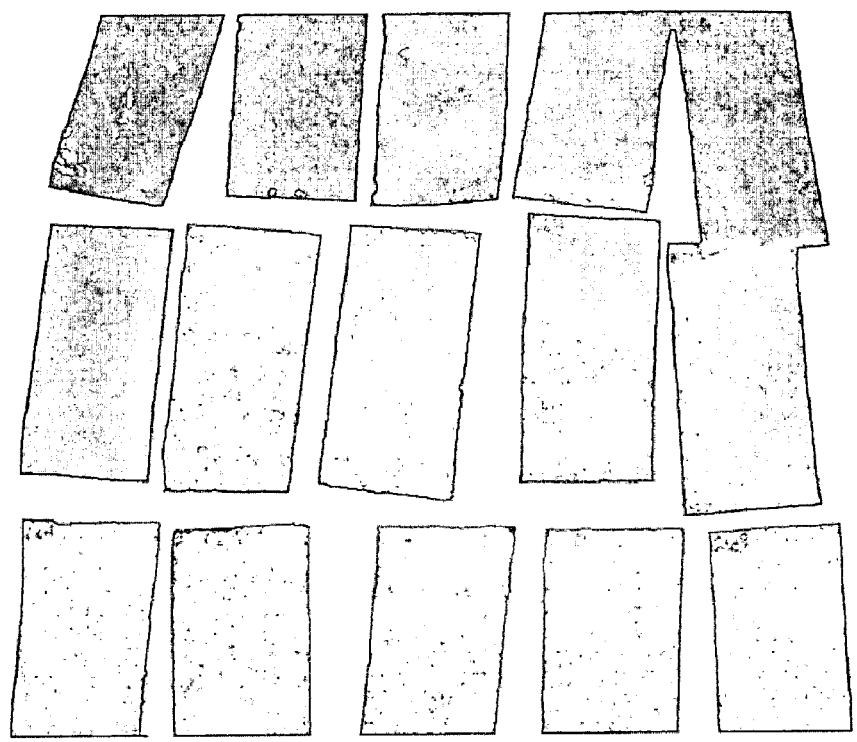
FIG. 5 shows a sample comparison from dust adherence test (panel set C), with the control on top, composition of the instant invention of Example 1 in the center, and Brand X competitor product on the bottom.
Figure 6:
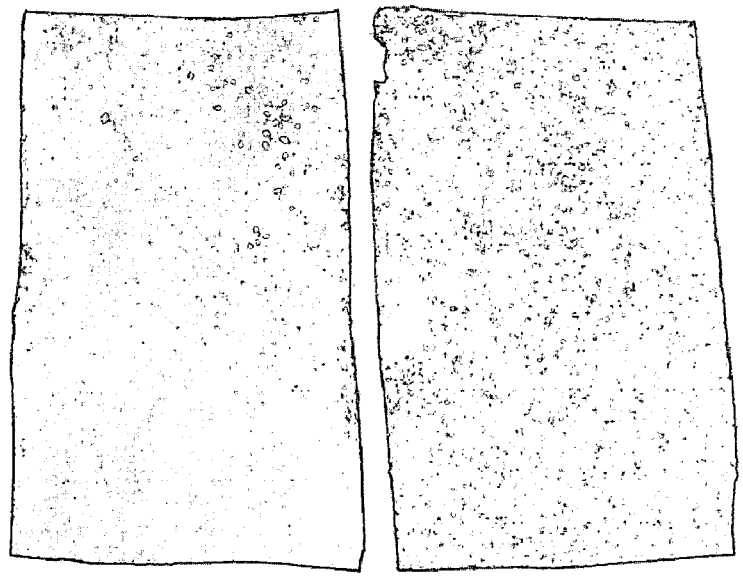
FIG. 6 shows a sample comparison from dust adherence test (panel set D), with the composition of the instant invention of Example 1 on the left and Brand X competitor product on the right.
Figure 7:
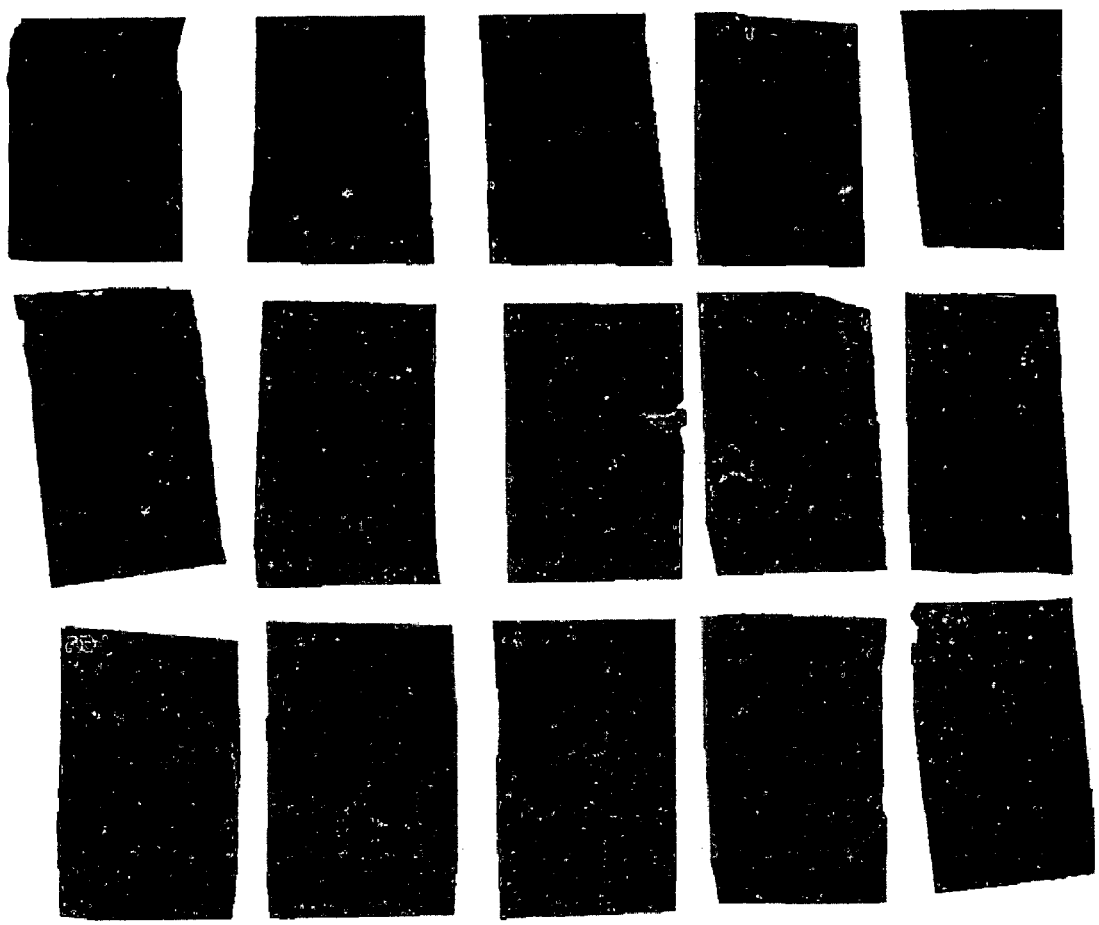
FIG. 7 shows a sample comparison from dust adherence test (panel set D), with the control on top, composition of the instant invention of Example 1 in the center, and Brand X competitor product on the bottom.
Figure 8:
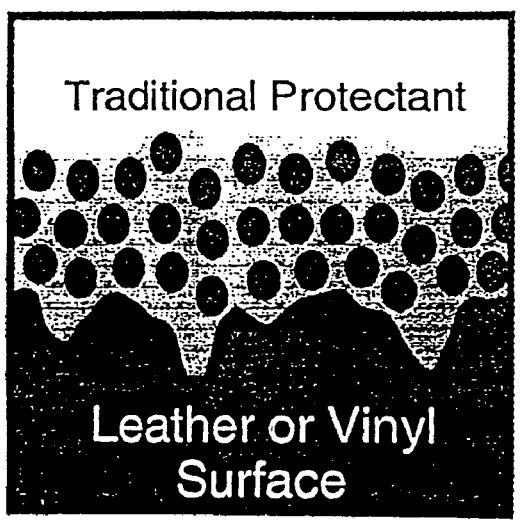
FIG. 8 is a drawing depicting conventional spray wax particles coating a surface.
Figure 9:
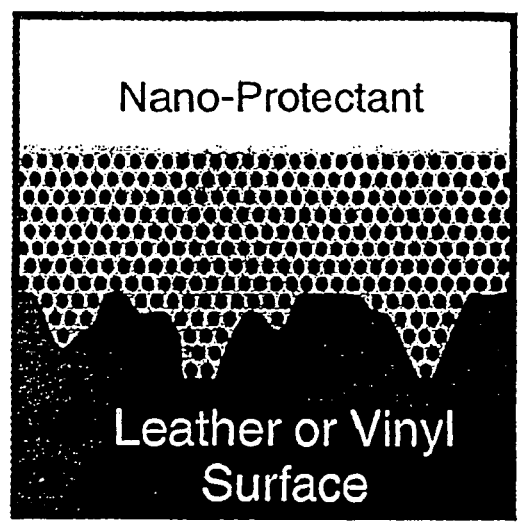
FIG. 9 is a drawing depicting the nanometer sized particles of the instant invention penetrating into small crevices and cracks providing a smooth coating on a surface.

The present protectant composition utilizes nano technology in a liquid wax. Unlike conventional protectants that use large particles of wax to provide a coating over irregular surfaces, the present invention uses nano particles of wax and UV protection agent to penetrate surfaces and fill small cracks, crevices and irregularities with nanoparticles size wax for optimal cleaning, conditioning, and UV protection.

The present invention provides a liquid protectant composition composed of nanometer sized carnauba wax particles and zinc oxide nanometer sized particles in combination with a silicone quat. The protectant composition of the present invention cleans, protects preserves and enhances the appearances of leather or vinyl surfaces used for covering items in the home or in vehicles. The product is easy to apply to both smooth and textured surfaces and has a transparent appearance. The product dries quickly and does not leave an oily residue. Utilization of nano technology to select components having nano sized particles provides a uniform deposition of the product leaving a thin film having exceptional protection properties. Unlike conventional protectants, the invention of the instant composition dries quickly and leaves no oily residue behind.

One preferred embodiment utilizes a composition containing nanometer zinc oxide particles, glycerin, a cationic microemulsion of carnauba wax particles, glycerin, a siloxane quat, and water. A fragrance or colorant may be added as an optional ingredient. More particularly, an example of a preferred embodiment utilizes the following ingredients based on the weight of the total composition: water in an amount of about 75 percent deionized water, zinc oxide having a particle size of about 60 nanometers in an amount of about 0.02 percent by weight, a silicone quat in an amount of about 5 percent by weight, glycerin in an amount of about 10 percent by weight, and a micro emulsion of a cationic carnauba wax in an amount of about 10 percent by weight. The composition may as an option also contain about 0.05 percent by weight of a fragrance A preferred embodiment of the protectant composition comprises water in an amount from 50-90 percent by weight based on the total weight of the composition; zinc oxide having a particle size of about 60 nanometers in an amount of from 0.001 to 1.0 percent by weight based on the total weight of the composition; a silicone quat in an amount of 0.1 to 35 percent by weight of the total composition; and a microemulsion of a cationic carnauba wax in an amount of about 8 percent by weight of the total composition.

More specifically a preferred embodiment of the protectant composition consist essentially of water in an amount from 50-90 percent by weight based on the total weight of the composition; zinc oxide having a particle size of about 60 nanometers in an amount of from 0.001 to 1.0 percent by weight based on the total weight of the composition; a silicone quat in an amount of 0.1 to 35 percent by weight of the total composition; and a microemulsion of a cationic carnauba wax in an amount of about 8 percent by weight of the total composition.

It is an object of the present invention to provide a protectant composition which deposits rapidly on a vinyl or leather substrate while providing excellent satin and lustrous shine and protection.

It is an object of the present invention to provide a protectant composition providing a satin finish while providing a quick drying time and antistatic properties.

It is an object of the present invention to provide a protectant composition utilizing a zinc oxide composition having a majority of the particles being nanometer sized particles of an average particles size of 60 nanometers to provide UV protection.

It is an object of the present invention to utilize nanoparticles of wax and UV protectants in order to increase the cold and hot temperatures ranges in which the product can be applied to the surface substrate.

It is an object of the present invention to provide a protectant composition which dries quickly and leaves no oily residue behind.

It is an object of the present invention to provide a protectant composition wherein upon application the product has a transparent appearance.

It is another object of the present invention to utilize a natural wax having a cationic charged micro emulsion as a delivery system.

It is an object of the present invention to provide a protectant composition for use on interior vinyl, leather, or other synthetic surfaces of vehicles and on other items utilizing covered with vinyl or leather.

Molecular level waxing protectant composition of the present invention facilitates ionic exchanges. Positively charged dirt particles become entrained into the aqueous phase of mixture. Dirt is ionically repelled from the surface while the wax within the mixture attaches to the uncharged now clean surface. The cationic waxed surface then presents a polar coating. The charged waxed surface actually resists dirt by providing a barrier to the positively charged dirt particles. The polar coating stays on the waxed surface of an indefinite period. As long as the polar coating remains dirt is repelled.

Other feature and advantages of the invention will be apparent from the following description of the preferred embodiments thereof, and from the claims.

DESCRIPTION OF THE PREFERRED EMBODIMENT

According to the present invention, there are provided compositions for cleaning, preserving, protecting synthetic plastic, vinyl and leather products. The protectant composition is easy to apply to both smooth and textured surfaces and has a transparent appearance. The product dries quickly and does not leave an oily residue. Utilization of nano technology to select components having nano sized particles provides a uniform deposition of the product leaving a thin film having exceptional protection properties. Unlike conventional protectants, the invention of the instant composition dries quickly and leaves no oily residue behind. Moreover, the formulation has a transparent appearance. It can be applied to smooth and textured surfaces with ease and resists running and dripping.

The wax product can comprise a synthetic wax instead of, or in addition to, the natural waxes; however, the preferred embodiment utilizes both synthetic and natural waxes and more particularly a wax having a cationic charge whereby the wax provides a surface-active substance in which the active constituent is the positive ion.

The preferred wax component is carnauba wax, more particularly a cationic microemulsion of carnauba wax. It is contemplated that alternate plant waxes such as candelilla, orange-peel, montan, and/or japan wax could be utilized in the present invention as alternate wax components, preferably in a cationic microemulsion form. It is contemplated that synthetic waxes such as polyethylene wax, polypropylene wax, polyamide wax, and combinations thereof can also be utilized in the instant invention.

The instant invention preferably utilizes at least one natural wax such as carnauba wax. The wax is provided as a microemulsion, typically a cationic emulsion consisting of about 12-15 percent by weight solid wax particles having a particle size of from about 10 to 50 nanometers. For example, a cationic carnauba polish, such as a micro emulsion (15% emulsion) or a (12% emulsion) can be utilized in the present composition. The water based emulsion contains ethylene glycol as co-emulsifier at about 20% by weight and an aliphatic amine derivatives as emulsifier, available from Tomah Products, Inc. under the tradename of EMULSION C-340.

Of course the wax could be obtained dry and dispersed within the blend of components separately from the emulsion providing the same functional qualities; however, it is more convenient to obtain the wax in the form of an emulsion from commercial vendors. The wax emulsion consisting of about 12% wax is added to the wax composition blend in an effective amount to form a thin film on a wetted surface upon buffing, ranging from 0.1 to 20.0 percent by weight, and more preferably in a range of from 5.0 to 15.0 percent by weight, and more preferably in a range of from between 8.0 to 12.0 percent by weight based on the total weight of the composition. One preferred embodiment uses 10 percent by weight of a 12% carnauba emulsion. The percent by weight is based on the amount of (12% wax emulsion in the total composition) rather than the percent of the active ingredient (pure wax). For instance, use of a 15% of cationic carnauba wax microemulsion in amount of 20.0 weight percent results in about 3% by weight of the carnauba wax as an active ingredient based on the weight of the total composition.

The cationic emulsifier and its positive charge is attracted to the negatively charged car surface which becomes slightly hydrophobic attracting the waxes and oils to the surface resulting in a sheeting action due to the quaternary cationic surfactant. The resulting wax formulation formulated with a cationic micro emulsion results in a higher buffing resistance and higher durability.

Silicone Quat

Because of their positive charge, quaternary ammonium functional silicones, ("silicon quats"), are useful in treating materials and surfaces that are primarily negatively charged, such as in many textile and personal care applications. The quaternary ammonium functionality makes possible certain ionic interactions that are the basis of many useful properties. These include increased hydrophilic character, ability to act as a thickener, and improved ability to aid in the deposition of other materials such as coatings and conditioning agents.

The silicone quat gives gloss enhancement while providing a quick drying time and antistatic properties to the spray wax formulation. Furthermore, it provides excellent luster, superior beading and sheeting action, it is soluble in oil and water, is compatible with cationic microemulsions and is synergistic with the cationic wax microemulsion of the present invention. It has antistatic effects, substantive surfaces, a low viscosity of from 150 to 500 at 25 C, and is stable at acidic pH. Unlike conventional silicon products, silicone quat molecules actually unfold to provide a leveling condition and smoother surface for adherence of the wax particles.

A preferred embodiment of the present invention utilizes a silicone quat such as is sold under the tradename of TEGO POLISH ADDITIVE Q70, available from Degussa having a pH range of from 7 to 9, viscosity from 150-500 cps @ 25° C., and a density @ 25° C. of from 0.950 to 0.970 g/ml. It is a quaternary blend containing 70 percent solids of a long silicone chain based—silicone quat having 70 percent active quaternary particles in solvents comprising at least in part 2-propanol, 1-butoxy. It has a pH of 8.5 and dynamic viscosity of 250 mPA·s at 25° C. as measured on a Brookfield viscometer. The particle size of the silicone quat are provided by the supplier in solution of 80% solids.

The molecule appears as follows:

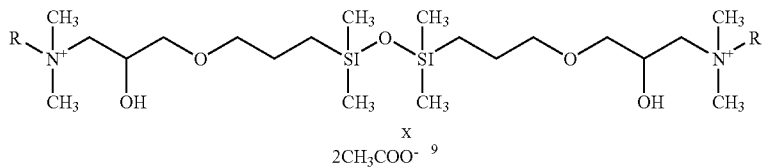

Another preferred silicon quat is available from the Dow Corning Corporation and comprises nanometer size silicone quat particles in a microemulsion such as sold under the tradename of DOW CORNING 5-7113 which is a silicone quat microemulsion comprising a 25% non-ionic emulsion of a cationized amino-functional silicone polymer. More particularly, the silicon quat in one preferred embodiment is silicone quaternium-16 and undeceth-11 and butyloctanol and undeceth-5. The microemulsion contains 25 percent by weight of silicone in a non-ionic emulsification in which water is a suitable diluent. In accordance with the MSDS sheet incorporated herein by reference, the silicon quat compound also contains about 60 percent water and from 14 to 40 percent of methylamino siloxane with glycidyl trimethylammonium chloride, from 7 to 13 percent of alkyl polyethylene glycol, and from 3.0 to 7.0 percent 2-butyloctanol. The microemulsion contains silicon quat particles below about 280 nanometers and more preferably less than 200 nanometers, wherein particles sizes below 20 nanometers appear as water clear and are transparent.

It is contemplated that other silicon quaternary compounds can be selected as suitable silicon quats used in the present invention such as those disclosed in U.S. Pat. No. 5,925,341 by Cervantes et al. issued on the 20 of Jul. of 1999, U.S. Pat. No. 6,607,717 by Johnson et al. which issued on the 19 of Aug. of 2003, and U.S. Pat. No. 6,461,537 which issued on the 8 of Oct. of 2002 all of which are incorporated herein by reference.

The amount of silicone quat in at least one preferred embodiment of the present invention is present in an effective amount of up to 1 percent by weight of the total composition. However, the more preferred embodiments of the invention utilizes an effective amount of silicon quat up to about 50 percent by weight of the total weigh of the composition. Preferred embodiments typically use an effective amount ranging from 0.1 to 35 percent by weight, and more preferably in a range of from to 1.0 to 25 percent by weight, and more preferably in a range of from between 2.0 to 15 percent by weight, and more preferably between 3.0 to 10 percent by weight based on the total weight of the composition. One preferred embodiment silicone quat in an amount of about 5.0 percent by weight based on the total weight of the final composition.

UV Protection (Zinc Oxide)

Figure 10:
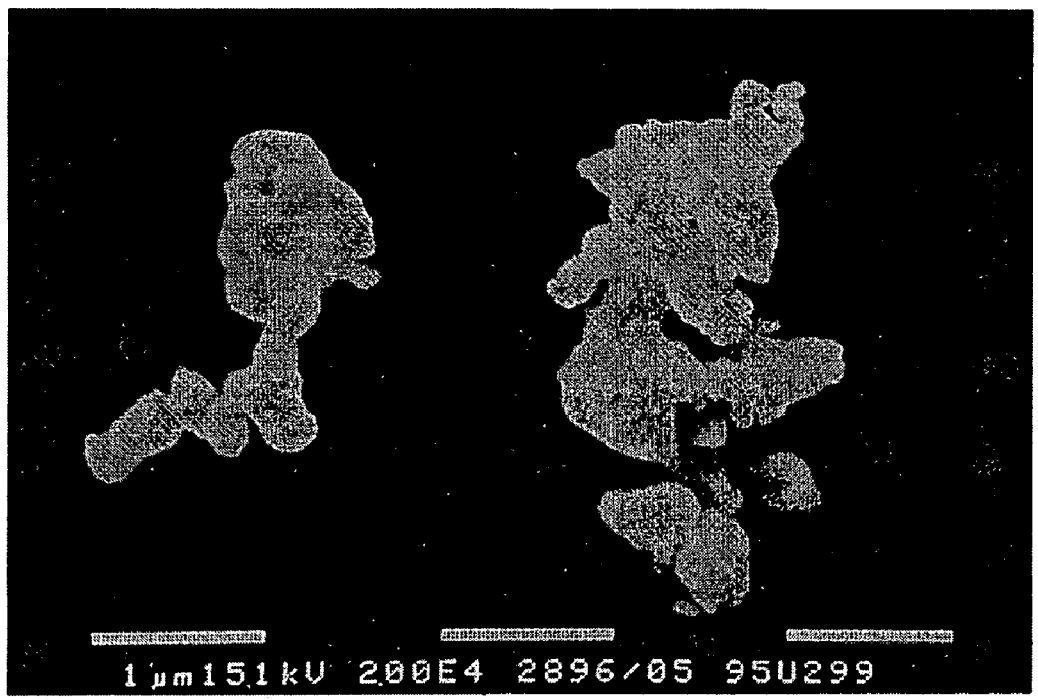
FIG. 10 shows a scanning electron microscope micrograph of a regular zinc oxide particle.
Figure 11:
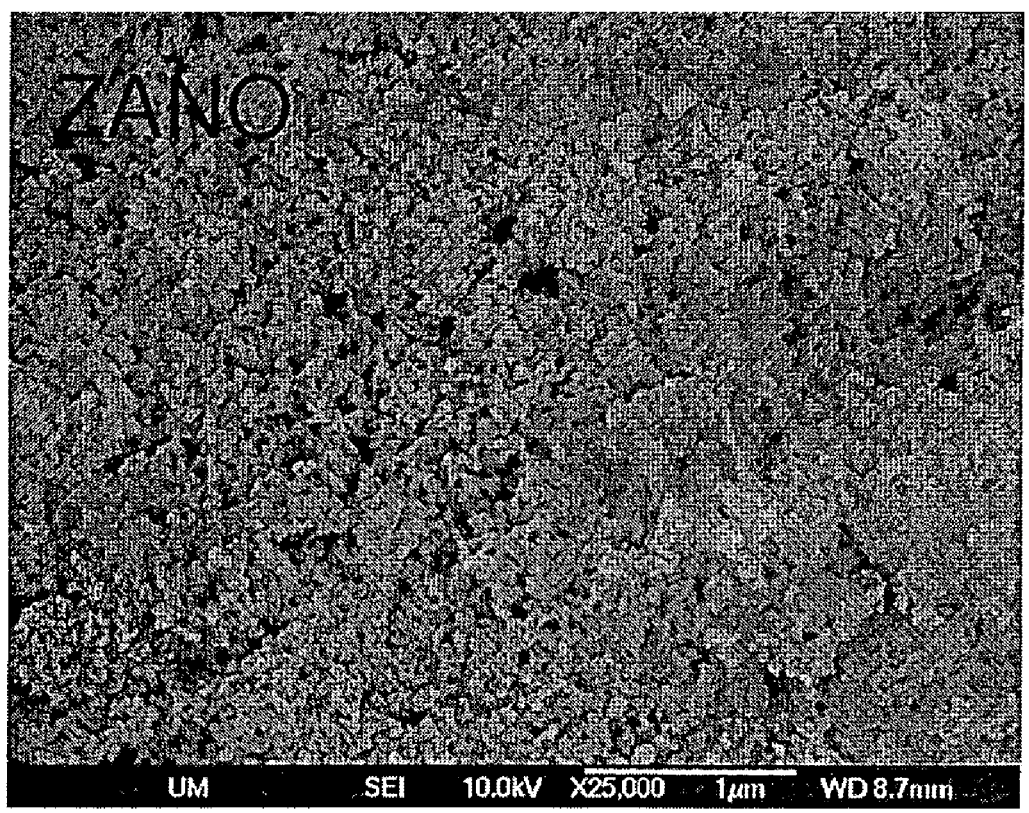
FIG. 11 is a scanning electron microscope microphotograph of a zinc oxide nanometer sized particle at a magnification of 25,000.
Figure 12:
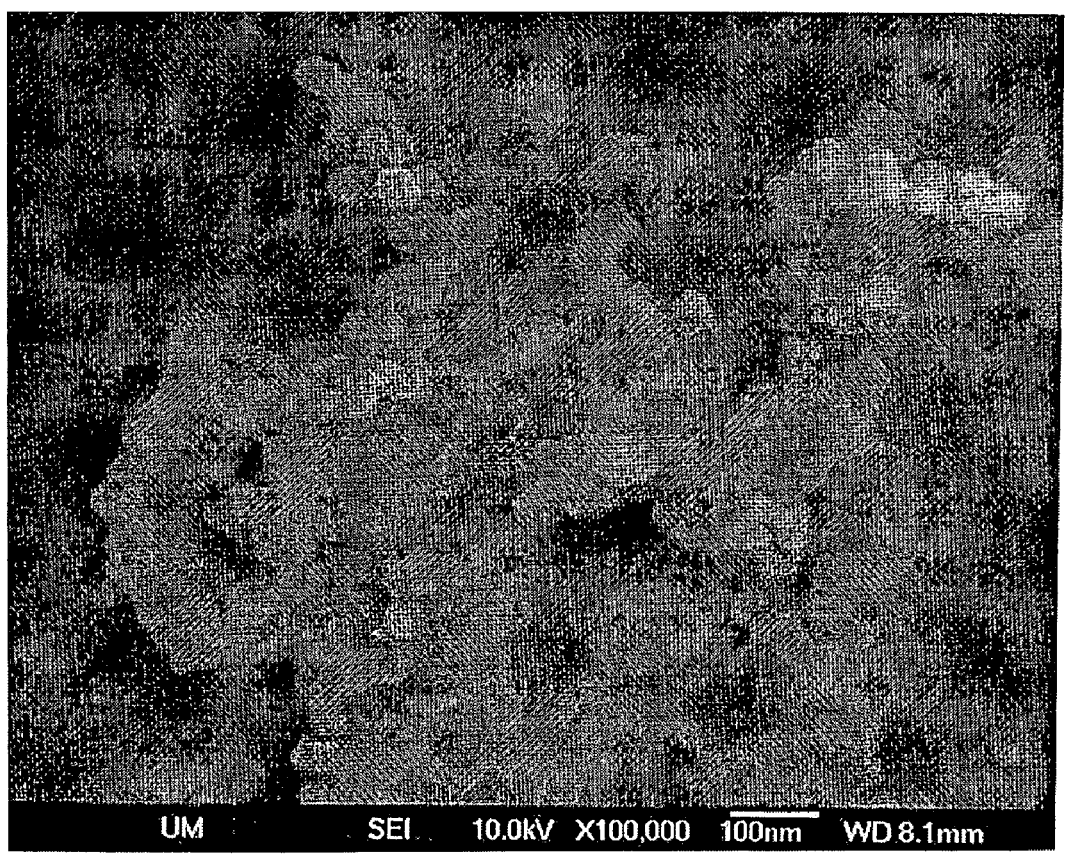
FIG. 12 shows that the homogeneous particle size distribution of the nanometer sized particle and its fine primary particle size result in good transparency.

A preferred embodiment of the present invention utilizes a nano-sized zinc oxide power which offers exceptional and along lasting broad spectrum UV-B/UV-A protection. It is highly effective to protect transparent plastics and plastic films from harmful ultraviolet radiation. Its homogeneous small particles and narrow particle size distribution provides for excellent transparency. It is non-migratory and has antibacterial properties. The mean particle diameter of the zinc oxide is less than 280 nanometers, preferably less than 200 nanometers, and typically about 35 nanometers. One source of the nanometer sized zinc oxide, (ZANO 20) is Umicore Zinc Chemicals in Belguim as depicted in the microphotographs shown in FIGS. 10-12. An alternate embodiment utilizes zinc oxide having an average particle size of 60 nanometers (calculated via SSA measurement) sold under the trade name of NANOGARD by Nanophase Technologies Corporation, in Romeoville, ill.

A conventional zinc oxide can be used in the instant formulation to provide UV protection to the instant composition; however, a preferred embodiment of the present invention utilizes a micro fine transparent nanometer sized zinc oxide powder which offers exceptional and along lasting broad spectrum UV-B/UV-A protection. It is highly effective to protect transparent plastics and plastic films from harmful ultraviolet radiation. Its homogeneous small particles and narrow particle size distribution provides for excellent transparency. It is non-migratory and has antibacterial properties.

Regular commercially available zinc oxides have specific surface areas below 10 $m_2/gr$, (typically 4-6 $m_2/gr$), resulting in high primary particle sizes which results in white particle in appearance. The mean particle diameter of the zinc oxide is about 35 nanometers and the majority of the particles range from about 20 to 35 nanometers. One source of the nanometer sized zinc oxide, (ZANO 20) is Umicore Zinc Chemicals in Belgium. The preferred embodiment utilizes zinc oxide particles having a specific surface area of minimum 20 $m_2/gr$, resulting in very fine loosely aggregated particles having a primary particle size below 60 nanometer providing a narrow particle size distribution allowing the zinc oxide to be used in transparent applications. Additional zinc oxide products available from Umicore Zinc Chemicals suitable for use in the present invention is sold under the tradename of ZANO LS and has a specific surface are of 20-30 $m_2/gr$ and a primary particle size (calculated) of about 35-55 nanometers; and ZANO HS which has a specific surface are of 30-40 $m_2/gr$ and a primary particle size (calculated) of about 25-35 nanometers. The homogeneous particle size distribution of the nanometer sized particle and its fine primary particle size result in good transparency. The nanometer sized zinc oxide particles are broad spectrum UV absorbers (UV-A and UV-B) which is not the case for micro fine TiO2 and organic UV absorbers. It also has antibacterial properties and is mildew resistant.

An alternate embodiment utilizes zinc oxide having an average particle size of 60 nanometers (calculated via SSA measurement) sold under the tradename of NANOGARD by Nanophase Technologies Corporation, in Romeoville, Illinois. Although it is sold as a white powder, the nanometer sized particles in low concentrations utilized in the preferred embodiments of the instant invention appear transparent.

The zinc oxide in at least one preferred embodiment of the present invention is present in an effective amount of up to 1.0 percent by weight of the total composition. The more preferred embodiments of the invention utilizes an effective amount of glycerin ranging from 0.001 to 1.0 percent by weight, and more preferably in a range of from to 0.005 to 0.6 percent by weight, and more preferably in a range of from between 0.01 to 0.4 percent by weight, and more preferably between 0.05 to 0.2 percent by weight based on the total weight of the composition. One preferred embodiment as set forth in Example 1, uses nanoparticles of zinc oxide in an amount of about 0.1 percent by weight based on the total weight of the paste wax composition.

Glycerin

At least one preferred embodiments of the present invention utilize glycerine, 99.5% min USP vegetable grade in an effective amount up to 20 percent by weight. A glycerine is a humectant which is hygroscopic provides a stabilizing action to keep the moisture content within a desired range and minimize humidity fluctuations. It aids in dispersion and clarity of the wax. A preferred humectant contains alcohol groups and is a glycol compound selected from the group including ethylene glycol, diethylene glycol, propylene glycol, methyl alcohol, ethyl alcohol, propyl alcohol, isopropyl alcohol, glycerol, and combinations thereof. More preferably the humectant is added in an effective amount in a range of from between 1 to 18.0 percent by weight, more preferably in a range of from 3.0 to 15.0 percent by weight, more preferably in a range of from between 6.0 to 12.0 percent by weight based on the total weight of the composition. One preferred embodiment of the present invention includes about 10 percent by weight of glycerin based on the total weight of the composition.

Fragrance

Although not required, an effective amount of one or more fragrances, such as vanilla, bubble gum, orange, fruity bouquet and the like may be added to the instant invention to impart a desirable scent to the product. Preferably the fragrance is present in an amount of up to 2 percent by weight, and more preferably of from between 0.001 to 1.0 percent by weight, and more preferably of from between 0.01 to 0.5 percent by weight. One preferred embodiment contains about 0.4 percent by weight of fruity bouquet based on the total weight percent of the composition.

A protectant composition may further comprise a preservative such as BIOBAN BP PLUS in an amount of about 0.1 percent by weight of the total composition.

Dyes, and/or colorants may also be added to the wax composition in an effective amount of less than 0.1 percent by weight based on the total weight of the composition.

As an option the present protectant composition utilizes a fragrance such as that sold under the tradename of COOL WAVE FRAGRANCE available from Aryleessence, Inc. in Marietta, Ga.

EXAMPLES

The following examples provide formulations in accordance with the present invention and provide examples of the range of ingredient percentages by weight providing an effective amount of the particular ingredients deemed necessary to obtain a high gloss finish in a single application.

Preparation of the wax compositions set forth in the following examples involved mixing the ingredients as follows wherein each ingredient is mixed well before adding the next ingredient. Add zinc oxide to the water and mix, adding and mixing the silicone quat, adding and mixing the glycerin, adding and mixing the micro emulsion of wax, and optionally adding and mixing the fragrance.

The product is applied by 1) spraying the protectant composition onto the leather, vinyl, or other synthetic surface; 2) rubbing gently with a soft, clean cloth; and 3) buffing lightly until dry with a clean cloth.

Preferred formulas for the wax composition of the present invention is set forth in following examples:

Example 1

| Constituent | Commercial Name | Percent by Weight |
|---|---|---|
| Cationic carnauba wax micro emulsion (15% solids emulsion) | TOMAH C-340 | 10.0 |
| Glycerin | | 10.0 |
| Silicon Quat (Tego Polish Additive Q-70) | | 5.0 |
| Zinc Oxide (average particle size 60 nanometers) | | 0.02 |
| Water Soft or Deionized | | 74.93 |
| Fragrance | | 0.05 |

Example 2

| Constituent | Commercial Name | Percent by Weight |
|---|---|---|
| Cationic carnauba wax micro emulsion (15% solids emulsion) | TOMAH C-340 | 10.0 |
| Glycerin | | 10.0 |
| Silicon Quat (Tego Polish Additive Q-70) | | 5.0 |
| Zinc Oxide (average particle size 60 nanometers) | | 0.02 |
| Water Soft or Deionized | | 74.83 |
| Fragrance | | 0.05 |
| Preservative | Bioban BP PLUS | 0.1 |

Example 3

| Constituent | Commercial Name | Percent by Weight |
|---|---|---|
| Cationic carnauba wax micro emulsion (15% solids emulsion) | TOMAH C-340 | 10.0 |
| Glycerin | | 10.0 |
| Silicon Quat (Tego Polish Additive Q-70) | | 5.0 |
| Zinc Oxide (average particle size 60 nanometers) | | 0.02 |
| Water Soft or Deionized | | 74.83 |
| Fragrance | | 0.05 |
| Preservative | Bioban BP PLUS | 0.1 |

Tests

Dust Adherence Test

Followed test procedure Test Method for Dust Adherence (Mar. 22, 2005) with following modifications:

1. Use 3"×6" vinyl/interior panels (initially 5 each for test products and control).
2. Do not wash surface before use of test products.
3. Follow directions on test product panels.
4. The control shall be untreated panels cleaned with interior cleaner.
5. Do not place panels into oven.

Results

The data are presented in Tables 1-4. The composition according to the present invention as set forth in Example 1 was superior to a leading competitor(Brand X) on all panel sets. Average dust adherence over the 4 panel sets (5 panels per set) are summarized below.

| Set | Control (mg) | Example 1 (mg) | X (mg) |
|---|---|---|---|
| A | 22.4 | 38.8 | 80.1 |
| B | 56.0 | 30.9 | 184.9 |
| C | 18.6 | 22.7 | 132.0 |
| D | 28.1 | 35.8 | 185.2 |
| Avg | 31.3 | 32.1 | 145.6 |

Pictures of the panels after the test are set forth as FIGS. 1-7.

Friction Test (for Stickiness)

6. Wipe test panels (3"×12") with KIMWIPES. Measure COF of each panel with hand-held friction tester (in two directions). Record as background COF.

7. Apply test products to ⅓ of panels, with the remaining used for control. The control panels should be cleaned with interior cleaner, while the test products should be applied per the package directions.

8. Record friction of treated panels and control with hand-held friction tester. Contacting balls on friction tester should be cleaned with acetone before test. Take 3 measurements of each panel, and average. The mean of each panel shall be the official measurement value.

Results

Data are presented in Tables 5 and 6 in the Appendix. There was no discernible difference in friction after treatment between the NanoProtectant and Armour All. This is not a viable test for this product.

9. UV Stability Test

Dust Adherence Test Data

The number dm is the mass of the dust that stuck to the treated panel. The Average is the average of the 5 panels for each treatment. So, in Data Set A, the untreated panels (Control) had an average of 22.4 mg to stick to them, the composition of Example 1 treated panels had 38.8 mg, and the Brand X panels had 80.1 mg dust to stick.

Table 1. Dust Adherence Test Data Set A

TABLE 1

Dust Adherence Test Data Set A

| Data Set A | | $m_i$ (g) | $m_f$ (g) | dm (g) | Average |
|---|---|---|---|---|---|
| Control | 1 | 43.0060 | 43.0278 | 0.0218 | |
| | 2 | 57.0844 | 57.0989 | 0.0145 | |
| | 3 | 56.2787 | 56.2999 | 0.0212 | |
| | 4 | | 53.5932 | 0.0286 | |
| | 5 | 55.7059 | 55.7317 | 0.0258 | 0.0224 |
| Example 1 | 1 | 47.1353 | 47.1771 | 0.0418 | |
| | 2 | 57.5095 | 57.5589 | 0.0494 | |
| | 3 | 45.5291 | 45.5677 | 0.0386 | |
| | 4 | 46.1843 | 46.2223 | 0.0380 | |
| | 5 | 58.9239 | 58.9502 | 0.0263 | 0.0388 |
| Brand x | 1 | 52.2478 | 52.3003 | 0.0525 | |
| | 2 | 43.7565 | 43.8147 | 0.0582 | |
| | 3 | 56.8667 | 56.9415 | 0.0748 | |
| | 4 | 55.6899 | 55.8081 | 0.1182 | |
| | 5 | 45.3740 | 45.4709 | 0.0969 | 0.0801 |

Table 2. Dust Adherence Test Data Set B

TABLE 2

Dust Adherence Test Data Set B

| Data Set B | | $m_i$ (g) | $m_f$ (g) | dm (g) | Average |
|---|---|---|---|---|---|
| Control | 1 | 9.2227 | 9.2448 | 0.0221 | |
| | 2 | 10.1974 | 10.2261 | 0.0287 | |
| | 3 | 10.0230 | 10.1544 | 0.1314 | |
| | 4 | 10.0254 | 10.0955 | 0.0701 | |
| | 5 | 10.2721 | 10.2998 | 0.0277 | 0.0560 |
| Example 1 | 1 | 12.0081 | 12.0399 | 0.0318 | |
| | 2 | 7.9419 | 7.9698 | 0.0279 | |
| | 3 | 10.5733 | 10.6064 | 0.0331 | |
| | 4 | 10.5289 | 10.5573 | 0.0284 | |
| | 5 | 11.6002 | 11.6335 | 0.0333 | 0.0388 |
| Brand x | 1 | 9.8297 | 10.0168 | 0.1871 | |
| | 2 | 8.8939 | 9.0657 | 0.1718 | |
| | 3 | 9.9618 | 10.1459 | 0.1841 | |
| | 4 | 10.6130 | 10.8039 | 0.1909 | |
| | 5 | 9.8125 | 10.0029 | 0.1904 | 0.0801 |

Table 3 Dust Adherence Test Data Set C

TABLE 3

Dust Adherence Test Data Set C

| Data Set C | | $m_i$ (g) | $m_f$ (g) | dm (g) | Average |
|---|---|---|---|---|---|
| Control | 1 | 8.5348 | 8.5429 | 0.0081 | |
| | 2 | 9.7721 | 9.7888 | 0.0167 | |
| | 3 | 9.9486 | 9.9740 | 0.0254 | |
| | 4 | 10.7105 | 10.7323 | 0.0218 | |
| | 5 | 9.8339 | 9.8548 | 0.0209 | 0.0186 |
| Example 1 | 1 | 10.8412 | 10.8513 | 0.0101 | |
| | 2 | 8.9154 | 8.9532 | 0.0378 | |
| | 3 | 8.9338 | 8.9446 | 0.0108 | |

TABLE 3-continued

Dust Adherence Test Data Set C

| Data Set C | | $m_i$ (g) | $m_f$ (g) | dm (g) | Average |
|---|---|---|---|---|---|
| | 4 | 13.0848 | 13.1068 | 0.0220 | |
| | 5 | 9.9133 | 9.9461 | 0.0328 | 0.0227 |
| Brand x | 1 | 11.2972 | 11.4318 | 0.1346 | |
| | 2 | 11.9994 | 12.0934 | 0.0940 | |
| | 3 | 14.3935 | 14.5416 | 0.1481 | |
| | 4 | 13.9110 | 14.0518 | 0.1408 | |
| | 5 | 11.0219 | 11.1645 | 0.1426 | 0.1320 |

Table 4 Dust Adherence Test Data Set D

TABLE 4

Dust Adherence Test Data Set D

| Data Set D | | $m_i$ (g) | $m_f$ (g) | dm (g) | Average |
|---|---|---|---|---|---|
| Control | 1 | 9.7763 | 9.8090 | 0.0327 | |
| | 2 | 11.7224 | 11.7404 | 0.0180 | |
| | 3 | 10.7241 | 10.7604 | 0.0363 | |
| | 4 | 10.8315 | 10.8625 | 0.0310 | |
| | 5 | 11.1094 | 11.1321 | 0.0227 | 0.0281 |
| Example 1 | 1 | 11.1434 | 11.1729 | 0.0295 | |
| | 2 | 11.6185 | 11.6560 | 0.0375 | |
| | 3 | 10.3449 | 10.3771 | 0.0322 | |
| | 4 | 11.2991 | 11.3415 | 0.0424 | |
| | 5 | 11.0696 | 11.1070 | 0.0374 | 0.0358 |
| Brand x | 1 | 11.5214 | 11.7154 | 0.1940 | |
| | 2 | 11.3482 | 11.5719 | 0.2237 | |
| | 3 | 10.8605 | 11.0674 | 0.2069 | |
| | 4 | 11.0071 | 11.2216 | 0.2145 | |
| | 5 | 10.1860 | 10.2729 | 0.0869 | 0.1852 |

Table 5 Initial friction measurements on dashboard panels.

TABLE 5

Initial friction measurements on dashboard panels.

| | Background | | | | | |
|---|---|---|---|---|---|---|
| | Example 1 | | Brand x | | Control | |
| Panel | Direction 1 | Direction 2 | Direction 1 | Direction 2 | Direction 1 | Direction 2 |
| A | 19 | 21 | 20 | 21 | 21 | 21 |
| | 20 | 24 | 21 | 19 | 22 | 21 |
| | 22 | 18 | 22 | 19 | 22 | 21 |
| average | 20.33333 | 21 | 21 | 19.66667 | 21.66667 | 21 |
| COF | 0.140037 | 0.144628 | 0.144628 | 0.135445 | 0.149219 | 0.1446281 |
| B | 37 | 36 | 35 | 32 | 27 | 26 |
| | 37 | 37 | 37 | 35 | 30 | 25 |
| | 37 | 38 | 37 | 33 | 29 | 28 |
| average | 37 | 37 | 36.33333 | 33.33333 | 28.66667 | 26.3333333 |
| COF | 0.254821 | 0.254821 | 0.25023 | 0.229568 | 0.197429 | 0.18135904 |
| C | 17 | 18 | 19 | 20 | 17 | 18 |
| | 18 | 15 | 21 | 21 | 19 | 18 |
| | 19 | 16 | 20 | 20 | 20 | 19 |
| average | 18 | 16.33333 | 20 | 20.33333 | 18.66667 | 18.3333333 |
| COF | 0.123967 | 0.112489 | 0.137741 | 0.140037 | 0.128558 | 0.12626263 |
| D | 30 | 28 | 30 | 30 | 27 | 26 |
| | 32 | 30 | 31 | 31 | 29 | 28 |
| | 31 | 32 | 33 | 29 | 29 | 27 |
| average | 31 | 30 | 31.33333 | 30 | 28.33333 | 27 |
| COF | 0.213499 | 0.206612 | 0.215794 | 0.206612 | 0.195133 | 0.18595041 |

Table 6 Friction measurements on dashboard panels after treatment.

TABLE 6

Friction measurements on dashboard panels after treatment.
After Application

| Panel | Example 1 | | Brand x | | Control | |
|---|---|---|---|---|---|---|
| | Direction 1 | Direction 2 | Direction 1 | Direction 2 | Direction 1 | Direction 2 |
| A | 13 | 17 | 16 | 13 | 23 | 19 |
| | 15 | 15 | 13 | 12 | 21 | 19 |
| | 16 | 15 | 15 | 11 | 23 | 18 |
| average | 14.66667 | 15.66667 | 14.66667 | 12 | 22.33333 | 18.6666667 |
| COF | 0.10101 | 0.107897 | 0.10101 | 0.082645 | 0.153811 | 0.12855831 |
| B | 21 | 25 | 15 | 17 | 27 | 29 |
| | 23 | 22 | 17 | 17 | 28 | 27 |
| | 23 | 21 | 16 | 16 | 28 | 28 |
| average | 22.33333 | 22.66667 | 16 | 16.66667 | 27.66667 | 28 |
| COF | 0.153811 | 0.156107 | 0.110193 | 0.114784 | 0.190542 | 0.19283747 |
| C | 13 | 12 | 16 | 15 | 20 | 21 |
| | 13 | 14 | 16 | 16 | 19 | 19 |
| | 13 | 13 | 16 | 16 | 21 | 18 |
| average | 13 | 13 | 16 | 15.66667 | 20 | 19.3333333 |
| COF | 0.089532 | 0.089532 | 0.110193 | 0.107897 | 0.137741 | 0.13314968 |
| D | 11 | 12 | 15 | 15 | 27 | 28 |
| | 12 | 11 | 16 | 15 | 28 | 28 |
| | 12 | 12 | 14 | 15 | 27 | 28 |
| average | 11.66667 | 11.66667 | 15 | 15 | 27.33333 | 28 |
| COF | 0.080349 | 0.080349 | 0.103306 | 0.103306 | 0.188246 | 0.19283747 |

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

We claim:

1. A protectant composition, comprising:
   water in an amount from 50-90 percent by weight based on a total weight of the composition;
   zinc oxide having an average particle size of about 60 nanometers in an amount of from 0.001 to 1.0 percent by weight based on the total weight of the composition;
   a silicone quat in an amount of 0.1 to 35 percent by weight based on the total weight of the composition;
   and a microemulsion of a cationic carnauba wax in an amount of about 0.1 to 20.0 percent by weight based on the total weight of the composition.

2. The protectant composition of claim 1, further comprising a fragrance in an amount of about 0.05 percent by weight of the total composition.

3. The protectant composition of claim 1, further comprising a preservative in an amount of about 0.1 percent by weight of the total composition.

4. The protectant composition of claim 1, wherein said microemulsion of a cationic carnauba wax comprises about 8 percent by weight based on the total weight of the composition.

5. The protectant composition of claim 1, further comprising a humectant containing an alcohol group in an amount of up to 20 percent by weight based on the total weight of the composition.

6. The protectant composition of claim 5, wherein said humectant comprises a glycol selected from the group consisting of an ethylene glycol, a diethylene glycol, a propylene glycol, a methyl alcohol, an ethyl alcohol, a propyl alcohol, an isopropyl alcohol, a glycerol, and combinations thereof.

7. A protectant composition, consisting essentially of:
   water in an amount from 50-90 percent by weight based on a total weight of the composition;
   zinc oxide having a mean particle diameter of less than 280 nanometers in an amount of from 0.001 to 1.0 percent by weight based on the total weight of the composition;
   a silicone quat in an amount of 0.1 to 35 percent by weight based on the total weight of the composition;
   and a wax having a particle size in a range of from about 10 to 50 nanometers in an amount of from 0.1 to 20 percent by weight based on the total weight of the composition.

8. The protectant composition of claim 7, said wax comprising a microemulsion.

9. The protectant composition of claim 7, said wax comprising a cationic wax.

10. The protectant composition of claim 7, wherein said wax comprises a natural wax selected from the group consisting of a carnauba wax, a candelilla wax, an orange-peel wax, a montan wax, a japan wax, and combinations thereof.

11. The protectant composition of claim 7, wherein said wax comprises a synthetic wax selected from the group consisting of a polyethylene wax, a polypropylene wax, a polyamide wax, and combinations thereof.

12. The protectant composition of claim 7, further comprising a humectant containing an alcohol group in an amount of up to 20 percent by weight based on the total weight of the composition.

13. The protectant composition of claim 12, wherein said humectant comprises a glycol selected from the group consisting of an ethylene glycol, a diethylene glycol, a propylene glycol, a methyl alcohol, an ethyl alcohol, a propyl alcohol, an isopropyl alcohol, a glycerol, and combinations thereof.

14. The protectant composition of claim 12, wherein said humectant is present in an amount of from between 3.0 to 15.0 percent by weight based on the total weight of the composition.

15. The protectant composition of claim 8, wherein said microemulsion comprises 12-15 percent by weight solid wax particles having a particle size of from about 10 to 50 nanometers.

16. The protectant composition of claim 7, wherein said wax is a cationic microemulsion selected from the group consisting of 10 percent by weight of wax particles, 12 percent by weight wax particles, 15 percent by weight wax particles, and combinations thereof.

17. The protectant composition of claim 7, wherein said silicone quat comprises about 60 percent water and from 14 to 40 percent of methylamino siloxane with glycidyl trimethylammonium chloride, from 7 to 13 percent of alkyl polyethylene glycol, and from 3.0 to 7.0 percent 2-butyloctanol.

18. The protectant composition of claim 7, wherein said silicone quat comprises particles of less than 280 nanometers.

19. The protectant composition of claim 7, wherein said silicone quat comprises an amount of from 2.0 to 15.0 percent by weight based on the total weight of the composition.

20. The protectant composition of claim 7, wherein said zinc oxide comprises particles having a mean particle size of from 20 to 200 nanometers.

21. The protectant composition of claim 7, wherein said zinc oxide comprises particles having an mean particle size of from 20 to 60 nanometers.

22. The protectant composition of claim 7, wherein said zinc oxide comprises particles having an mean particle size of from 35 to 200 nanometers.

23. The protectant composition of claim, 7 wherein said zinc oxide comprises an amount of from 0.01 to 0.4 percent by weight based on the total weight of the composition.

24. A protectant composition, comprising:
    water in an amount from 50-90 percent by weight based on a total weight of the composition;
    a zinc oxide having a mean particle diameter in a range of from 20 to 200 nanometers in an amount of from 0.001 to 1.0 percent by weight based on the total weight of the composition;
    a silicone quat in an amount of 0.1 to 35 percent by weight based on the total weight of the composition;
    a microemulsion of cationic wax in an amount of from 0.1 to 20 percent by weight based on the total weight of the composition; and
    a humectant containing at least one alcohol group in an amount of up to 20 percent by weight based on the total weight of the composition.

25. The protectant composition of claim 24, wherein said wax comprises a natural wax selected from the group consisting of a carnauba wax, a candelilla wax, an orange-peel wax, a montan wax, a japan wax, and combinations thereof.

26. The protectant composition of claim 24, wherein said wax comprises a synthetic wax selected from the group consisting of a polyethylene wax, a polypropylene wax, a polyamide wax, and combinations thereof.

27. The protectant composition of claim 24, wherein said humectant comprises a glycol selected from the group consisting of an ethylene glycol, a diethylene glycol, a propylene glycol, a methyl alcohol, an ethyl alcohol, a propyl alcohol, an isopropyl alcohol, a glycerol, and combinations thereof.

28. The protectant composition of claim 24, wherein said humectant is present in an amount of from between 3.0 to 15.0 percent by weight based on the total weight of the composition.

29. The protectant composition of claim 24, wherein said microemulsion comprises 12-15 percent by weight solid wax particles having a particle size of from about 10 to 50 nanometers.

30. The protectant composition of claim 24, wherein said zinc oxide having an mean particle size of from 35 to 200 nanometers.

* * * * *